US011416603B2

(12) United States Patent
Zhang et al.

(10) Patent No.: US 11,416,603 B2
(45) Date of Patent: Aug. 16, 2022

(54) METHODS, SYSTEMS, ARTICLES OF MANUFACTURE AND APPARATUS TO DETECT PROCESS HIJACKING

(71) Applicant: Intel Corporation, Santa Clara, CA (US)

(72) Inventors: Zheng Zhang, Portland, OR (US); Jason Martin, Beaverton, OR (US); Justin Gottschlich, Santa Clara, CA (US); Abhilasha Bhargav-Spantzel, Santa Clara, CA (US); Salmin Sultana, Hillsboro, OR (US); Li Chen, Hillsboro, OR (US); Wei Li, Hillsboro, OR (US); Priyam Biswas, West Lafayette, IN (US); Paul Carlson, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 16/246,187

(22) Filed: Jan. 11, 2019

(65) Prior Publication Data

US 2019/0163900 A1     May 30, 2019

Related U.S. Application Data

(60) Provisional application No. 62/768,893, filed on Nov. 17, 2018, provisional application No. 62/768,663, filed on Nov. 16, 2018.

(51) Int. Cl.
*G06F 21/52* (2013.01)
*G06N 20/00* (2019.01)
(Continued)

(52) U.S. Cl.
CPC .............. *G06F 21/52* (2013.01); *G06F 21/51* (2013.01); *G06F 21/566* (2013.01);
(Continued)

(58) Field of Classification Search
CPC ........ G06F 21/52; G06F 21/51; G06F 21/566; G06F 21/567; G06F 2221/033; G06N 20/00; G05B 19/4184; G05B 23/0245
See application file for complete search history.

(56) References Cited

U.S. PATENT DOCUMENTS 5,812,848 A * 9/1998 Cohen ...................... G06F 8/54
                                                           719/331
2015/0370560 A1* 12/2015 Tan ..................... G06F 9/30058
                                                           717/148
(Continued)

OTHER PUBLICATIONS

Chen et al., "HeNet: A Deep Learning Approach on Intel Processor Trace for Effective Exploit Detection," Jan. 8, 2018, 7 pages.

(Continued)

*Primary Examiner* — Michael R Vaughan
(74) *Attorney, Agent, or Firm* — Hanley, Flight & Zimmerman, LLC

(57) ABSTRACT

Methods, systems, articles of manufacture and apparatus to detect process hijacking are disclosed herein. An example apparatus to detect control flow anomalies includes a parsing engine to compare a target instruction pointer (TIP) address to a dynamic link library (DLL) module list, and in response to detecting a match of the TIP address to a DLL in the DLL module list, set a first portion of a normalized TIP address to a value equal to an identifier of the DLL. The example apparatus disclosed herein also includes a DLL entry point analyzer to set a second portion of the normalized TIP address based on a comparison between the TIP address and an entry point of the DLL, and a model compliance engine to generate a flow validity decision based on a comparison between (a) the first and second portion of the normalized TIP address and (b) a control flow integrity model.

25 Claims, 10 Drawing Sheets

(51) Int. Cl.
G06F 21/56 (2013.01)
G06F 21/51 (2013.01)
G05B 23/02 (2006.01)

(52) U.S. Cl.
CPC ........... G06F 21/567 (2013.01); G06N 20/00 (2019.01); *G05B 23/0245* (2013.01); *G06F 2221/033* (2013.01)

(56) References Cited

U.S. PATENT DOCUMENTS

| | | | |
|---|---|---|---|
| 2018/0082208 A1* | 3/2018 | Cormier | G06N 20/00 |
| 2018/0095764 A1 | 4/2018 | Sultana et al. | |
| 2020/0250302 A1* | 8/2020 | Chen | G06F 21/74 |

OTHER PUBLICATIONS

Abadi et al., "Control-Flow Integrity: Principles, Implementations, and Applications," ACM Transactions on Information and System Security, vol. 13, Issue 1, Oct. 2009 (14 pages).

Schuster et al., "Counterfeit Object-oriented Programming: On the Difficulty of Preventing Code Reuse Attacks in C ++ Applications," 2015 IEEE Symposium on Security and Privacy, retrieved online Feb. 3, 2022 (18 pages).

Ge et al. "Griffin: Guarding Control Flows Using Intel Processor Trace," ACM SIGPLAN Notices, vol. 52, Issue 1, Apr. 2017 (14 pages).

McAfee," McAfee Host Intrusion Prevention for Desktop: Proactive protection against zero-day threats," retrieved inline at [https://www.mcafee.com/enterprise/en-us/products/host-ips-for-desktop.html] on Feb. 3, 2022 (6 pages).

Payer et al. "Fine-Grained Control-Flow Integrity Through Binary Hardening," DIMVA 2015: Proceedings of the 12th International Conference on Detection of Intrusions and Malware, and Vulnerability Assessment, vol. 9148, Jul. 2015 (21 pages).

Zhang et al., "Practical Control Flow Integrity & Randomization for Binary Executables," 2013 IEEE Symposium on Security and Privacy, Jun. 25, 2013 (15 pages).

Gu et al. "PT-CFI: Transparent Backward-Edge Control Flow Violation Detection Using Intel Processor Trace," CODASPY '17: Proceedings of the Seventh ACM on Conference on Data and Application Security and Privacy, Mar. 2017 (12 pages).

Zhang et al., "Control Flow Integrity for COTS Binaries," USENIX The Advanced Computing Systems Association, 22nd USENIX Security Symposium, Aug. 2013 (17 pages).

Microsoft, "The Enhanced Mitigation Experience Toolkit," retrieved online at [https://web.archive.org/web/20181012172211/https://support.microsoft.com/en-us/help/2458544/the-enhanced-mitigation-experience-toolkit] on Feb. 3, 2022 (7 pages).

\* cited by examiner

METHODS, SYSTEMS, ARTICLES OF MANUFACTURE AND APPARATUS TO DETECT PROCESS HIJACKING

RELATED APPLICATIONS

This patent claims priority to U.S. Patent Application Ser. No. 62/768,663, which was filed on Nov. 16, 2018. This patent also claims priority to U.S. Patent Application Ser. No. 62/768,893, which was filed on Nov. 17, 2018. Both U.S. Patent Application Ser. No. 62/768,663 and U.S. Patent Application Ser. No. 62/768,893 are hereby incorporated herein by reference in their entireties.

FIELD OF THE DISCLOSURE

This disclosure relates generally to malware and viruses, and, more particularly, to methods, systems, articles of manufacture and apparatus to detect process hijacking.

BACKGROUND

In recent years, process hijacking has become a more frequent type of attack to subvert and divert clean applications to execute logic that is not designed by and/or otherwise part-of a targeted application. Process hijacking occurs as a result of the target application being compromised by a virus, a Trojan, ransomware, file-less malware, etc. Such hijacking penetrates into victim machines (e.g., computer platforms, servers, computing devices, etc.) and attempts to hide from anti-virus applications.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Hijack attack vectors may occur when an attacker delivers a malicious payload as one or more data inputs to a target process/application. When the target process/application processes such data inputs, logic associated with the malicious payload is triggered to cause the process/application (hereinafter referred to interchangeably as an application, a program, or a process) to operate in a manner not consistent with the intent of the designer/coder (e.g., to expose vulnerabilities of the platform, stack smashing, return oriented programming (ROP), etc). In some examples, hijack attack vectors may occur via one or more remote threat injection attempts, process hollowing, dynamic link library (DLL) injections, etc.

Examples disclosed herein enable control flow anomaly detection that employs performance telemetry information (e.g., central processing unit (CPU) trace signals) and machine learning techniques to generate anomaly detection models. As described in further detail below, examples disclosed herein improve a computational efficiency of anomaly detection by applying, in part, normalization techniques that reduce noise and evaluation complexity that is typically associated with target instruction pointer (TIP) address information from telemetry sources, such as processor trace (PT) information from PT generating hardware, performance monitor unit (PMU) information and/or last-branch record (LBR) information.

Generally speaking, typical security products detect process hijacking attacks through signature-based behavioral detection that analyzes program behaviors to detect patterns that are close to known malicious attacks. In some detection security products, control flow integrity (CFI) analysis is used, in which control flow of an executing program (e.g., each application has an expected map, control-flow-graph (CFG), or tree of execution steps/branches) is analyzed to identify deviations and/or redirection efforts that attempt to change the intended behavior of an application. However, typical CFI analysis techniques are computationally burdensome, require compiler cooperation, and cannot support encrypted applications. Unlike dependency on compiler cooperation to aid in static or compiler-based learning, examples disclosed herein employ dynamic learning during program execution and TIP address normalization, thereby allowing a time-series analysis that is unaffected by whether such source code of the application of interest is encrypted.

Figure 1A:
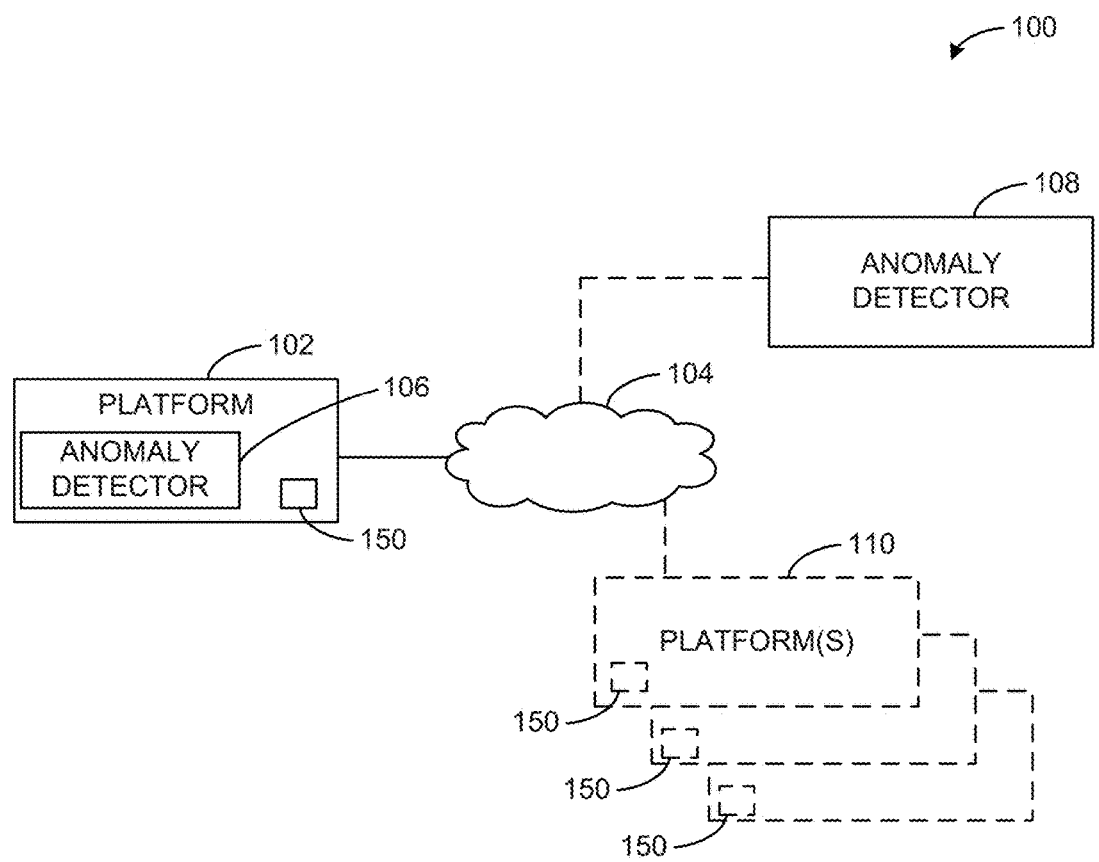
FIG. 1A is a schematic illustration of an example anomaly detection system to detect process hijacking.

FIG. 1A is a schematic illustration of an example anomaly detection system 100. In the illustrated example of FIG. 1A, the anomaly detection system 100 includes an example platform 102 communicatively connected to an example network 104. The example platform 102 may be any type of computing device, such as a personal computer (PC), a server, a laptop, a tablet, a wireless telephone, etc. The example platform 102 includes telemetry sources 150. In some examples, the telemetry sources 150 are hardware based circuitry that can generate program execution telemetries, such as processor trace (PT), Performance Monitor Unit (PMU) and Last Branch Record (LBR). The example platform 102 also includes an example anomaly detector 106 to detect process hijacking of the platform 102. While the example anomaly detector 106 is shown as an integrated structure of the example platform 102, examples disclosed herein are not limited thereto. In some examples, an external anomaly detector 108 may operate externally to one or more network-connected platforms 110 that are communicatively connected therebetween via the example network 104. In such examples, the external anomaly detector 108 may execute on one or more networked-connected computing devices (e.g., PCs, servers, server farms, cloud computing services (e.g., Amazon® Web Services (AWS), Azure Cloud Computing Services by Microsoft®, etc.)).

Figure 1B:
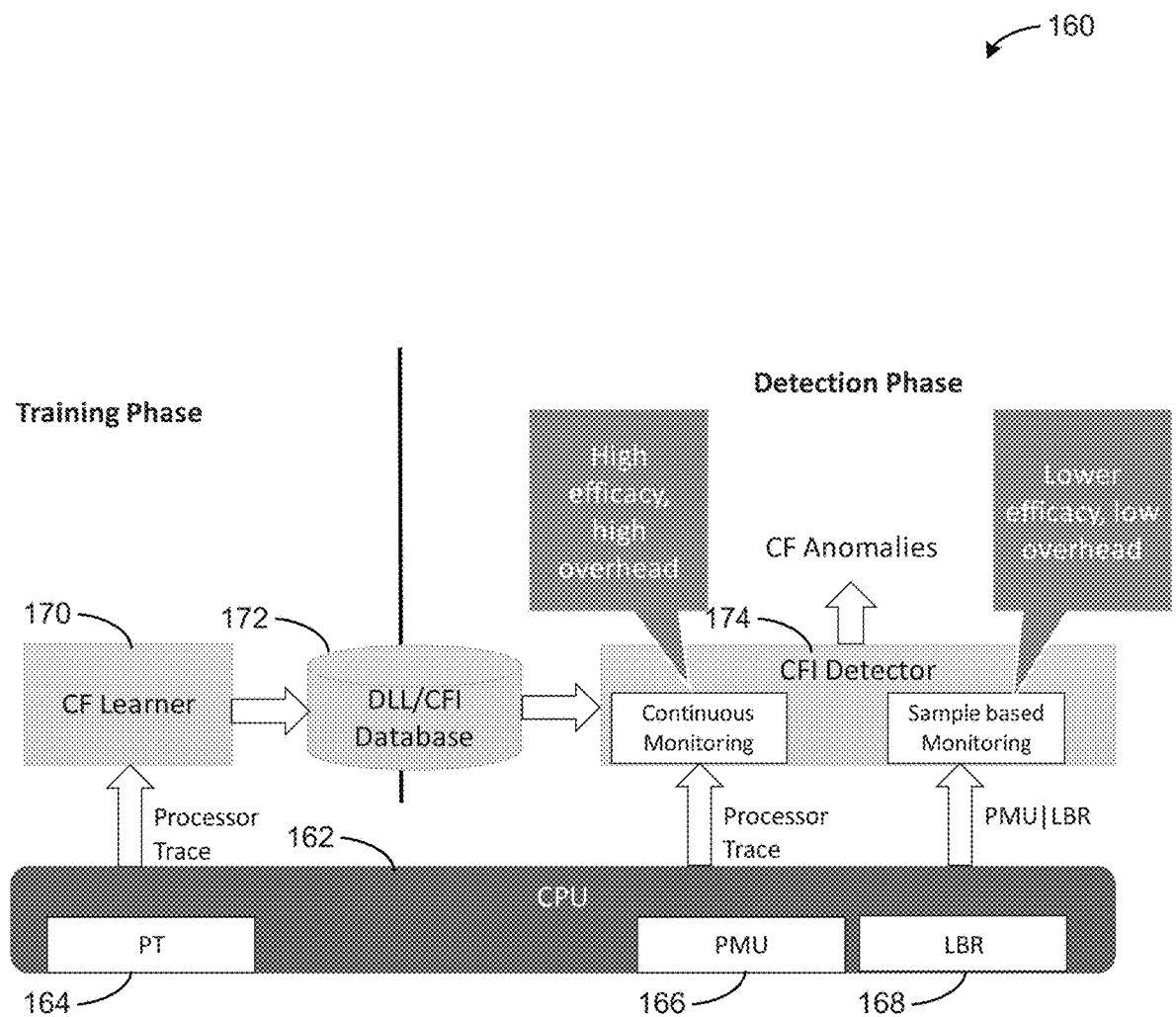
FIG. 1B is a schematic illustration of an example workflow implemented by the example anomaly detection system of FIG. 1A.

FIG. 1B is a schematic illustration of an example workflow 160 of the example anomaly detection system 100 of FIG. 1A. In the illustrated example of FIG. 1B, the workflow 160 includes processing resources 162, such as one or more CPUs, virtual machine(s) (VMs), and/or other computational resources capable of executing one or more applications to be monitored (e.g., monitored for instances of malicious threat(s)). As described above, telemetry sources (e.g., the example telemetry sources 150 of FIG. 1A) can include an example processor trace (PT) engine 164, an example performance monitor unit (PMU) 166, an example last branch record (LBR) engine 168, and/or other telemetry engines. The example processing resources collect telemetry information, such as PT traces, together with other event information, such as operating system DLL and/or thread events, as described in further detail below. Such PT information may be utilized by an example control flow (CF) learner engine 170 during a training phase to facilitate machine learning algorithm reinforcement, and CFI model updating (e.g., based on environmental feedback, as described in further detail below).

The example workflow 160 of FIG. 1B also includes an example DLL/CFI database 172, which can store metadata information corresponding to DLL loading event(s). In some examples, PT traces are forwarded to an example CFI detector 174 during a detection phase of operation, which may operate in a continuous monitoring mode that exhibits a relatively high efficacy with a relatively high overhead (demand) when compared to one or more alternate modes of operation. For instance, PMU information and/or LBR information may be forwarded to the example CFI detector 174, which may operate in a sample-based monitoring mode that exhibits a relatively lower efficacy, but with a relatively lower overhead when compared to the example continuous monitoring mode. Example structure and processes associated with the example workflow 160 of FIG. 1B and/or the example anomaly detection system 100 of FIG. 1A are described in further detail below.

Figure 2:
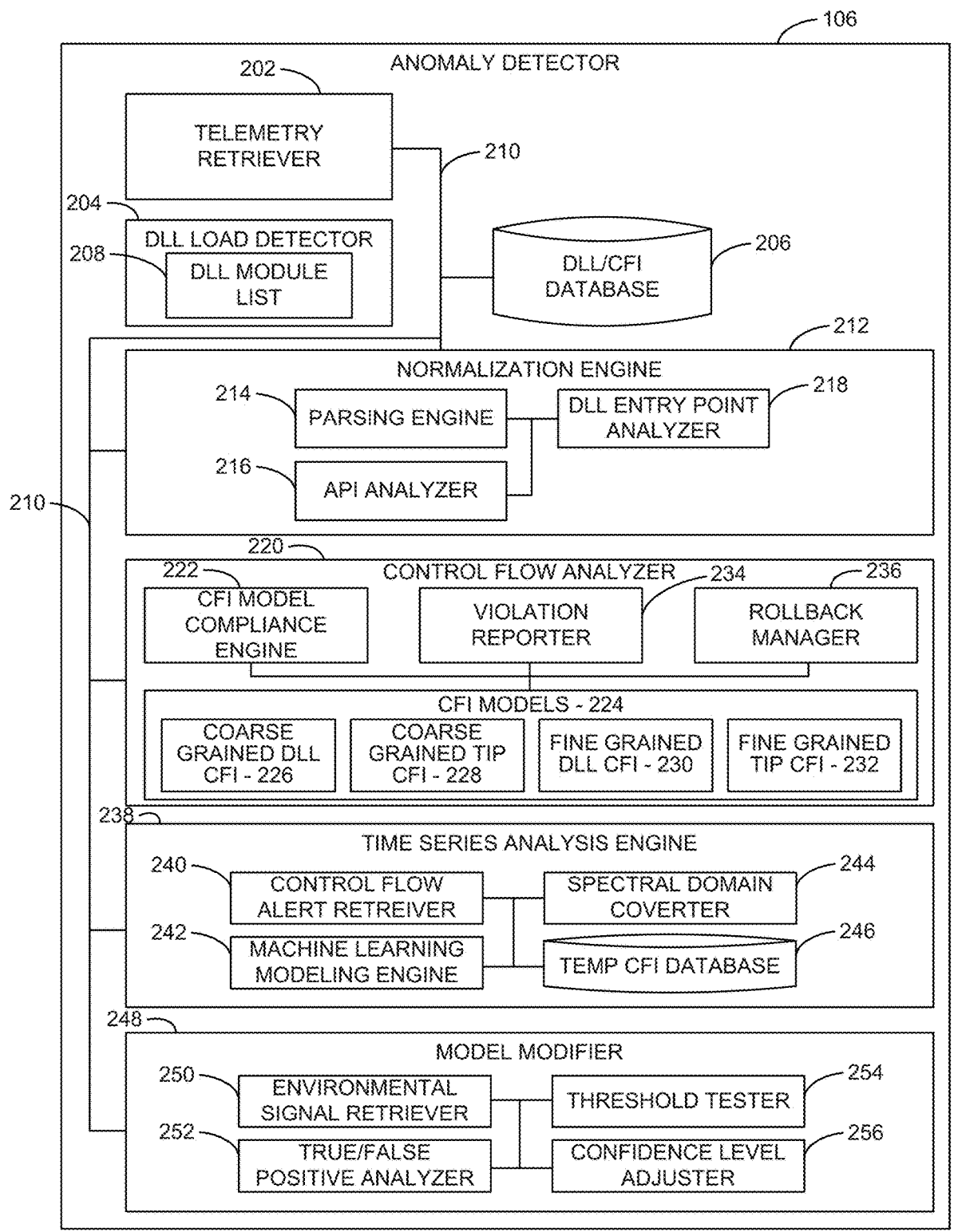
FIG. 2 is a schematic illustration of an example anomaly detector of FIG. 1A to detect process hijacking.

FIG. 2 is a schematic illustration of the example anomaly detector 106 of FIG. 1A. FIG. 2 is also a schematic illustration of the example external anomaly detector 108 of FIG. 1A, but examples discussed below make reference to the example anomaly detector 106 of FIG. 1A for convenience and not limitation. In the illustrated example of FIG. 2, the anomaly detector 106 includes an example telemetry retriever 202, an example dynamic link library (DLL) detector 204 and an example DLL/CFI database 206. The example DLL detector 204 includes an example DLL module list 208. The example anomaly detector 106 of FIG. 2 also includes a bus 210 to facilitate communication between respective structures of the example anomaly detector 106. In this example, the telemetry retriever 202 implements means for telemetry retrieving. The means for telemetry retrieving may additionally or alternatively be implemented by a telemetry retrieving means.

The example anomaly detector 106 of FIG. 2 also includes an example normalization engine 212, which includes an example parsing engine 214, an example application programming interface (API) analyzer 216, and an example DLL entry point analyzer 218. The example anomaly detector 106 of FIG. 2 also includes an example control flow (CF) analyzer 220, which includes an example CFI model compliance engine 222, and an example CFI model storage 224. In some examples, the CFI model storage 224 is part of the example DLL/CFI database 206, but is shown separately as a matter of convenience and clarity. The example CFI model storage 224 includes an example coarse-grained DLL CFI model 226, an example coarse-grained TIP CFI model 228, an example fine-grained DLL CFI model 230, and an example fine-grained TIP CFI model 232. In examples used herein, the CFI model storage 224 is referred to as the "CFI models 224." While the example CFI model storage 224 includes the example coarse-grained DLL CFI model 226, the example coarse-grained TIP CFI model 228, the example fine-grained DLL CFI model 230, and the example fine-grained TIP CFI model 232, such models may be stored elsewhere without limitation. In this example, the parsing engine 214 implements means for parsing. The means for parsing may additionally or alternatively be implemented by a parsing means. In this example, the DLL entry point analyzer 218 implements means for DLL analyzing. The means for DLL analyzing may additionally or alternatively be implemented by a DLL analyzing means. In this example, the model compliance engine 222 implements means for modeling. The means for modeling may additionally or alternatively be implemented by a modeling means. In this example, the API analyzer 216 implements means for interface analyzing. The means for interface analyzing may additionally or alternatively be implemented by an interface analyzing means.

Generally speaking, CFI analysis includes and/or otherwise involves a large number of attributes that can burden computing resources. Examples disclosed herein largely consider two example attributes of interest, one of which is source information and the other of which is destination information. Fine-grained CFI techniques consider both source information (e.g., source DLL identifiers, source TIP information) and destination information (e.g., target information, such as destination DLL identifiers) and, as a result, exhibit substantially greater computational burdens during CFI analysis. On the other hand, course-grained CFI techniques consider only destination/target information, thereby imposing a relatively lower computational burden during CFI analysis efforts. CFI analysis assigns tags to branch targets of an application CFG, in which fine-grained CFI assigns a substantially greater number of such tags as compared to coarse-grained CFI techniques. In some examples, the CFI analysis checks that indirect control transfers will point only to valid tags. In the illustrated example of FIG. 2, the coarse-grained DLL CFI model 226 includes known good destination DLL identifiers, the coarse-grained TIP CFI model 228 includes known good destination normalized TIP addresses (e.g., DLL address, offset address), the fine-grained DLL CFI model 230 includes known good DLL control flows (e.g., source DLL identifiers, destination DLL identifiers), and the fine-grained TIP CFI model 232 includes known good TIP control flows (e.g., source DLL identifiers, source TIP offset address information, destination DLL identifiers, destination TIP offset address information). The example control flow analyzer 220 of FIG. 2 also includes an example violation reporter 234 and an example rollback manager 236.

The example anomaly detector 106 of FIG. 2 also includes an example time series analysis engine 238. The example time series analysis engine 238 of FIG. 2 includes an example control flow alert retriever 240, an example machine learning modeling engine 242, an example spectral domain converter 244, and an example temporary CFI database 246. The example anomaly detector 106 of FIG. 2 also includes an example model modifier 248. The example model modifier 248 includes an example environmental signal retriever 250, an example true/false positive analyzer 252, an example threshold tester 254, and an example confidence level adjuster 256. In this example, the machine learning modeling engine 242 implements means for machine learning. The means for machine learning may additionally or alternatively be implemented by a machine learning means. In this example, the spectral domain converter 244 implements means for converting. The means for converting may additionally or alternatively be implemented by a converting means.

In operation, the example telemetry retriever 202 retrieves and/or otherwise receives performance telemetry information (e.g., CPU telemetry information), such as processor trace (PT) information, PMU information and/or LBR information (e.g., from the example telemetry sources 150). In some examples, the telemetry retriever 202 operates in a real-time environment in which an executing application is executed by a host processor of a platform (e.g., the example platform 102 of FIG. 1A), while in other examples the telemetry retriever 202 retrieves such previously saved trace and/or operating system signals that may have been captured and stored on a prior execution instance of the application of interest. In some examples, the telemetry retriever 202 retrieves performance telemetry information from the example hardware telemetry sources 150. As described above, example hardware telemetry sources 150 may be located in the example platform. As described above, such example telemetry sources 150 may include, but are not limited to, one or more performance monitor unit(s) (PMUs), one or more last branch record (LBR) unit(s), and/or one or more processor trace (PT) unit(s). In the event the example hardware telemetry sources 150 include PMUs, then instruction pointers are collected by the example telemetry retriever 202 during PMU interrupts to train coarse-grain DLL and TIP models and/or to detect coarse-grain control flow violations (e.g., detect control flow violation occurrences that are inconsistent with coarse-grain control flow models and/or fine-grain control flow models). In the event the example hardware telemetry sources 150 include LBR units, then the example telemetry retriever 202 will use a "from:to" address pair to train coarse-grain and fine-grain CFI models and detect coarse-grain and fine-grain control flow violations. The example DLL load detector 204 builds a DLL database (e.g., the example DLL/CFI database 206) to, in part, determine which DLLs are loaded by the application of interest and extract corresponding attributes of the loaded DLLs, as described in further detail below. In this example, the DLL load detector 204 implements means for load detection. The means for load detection may additionally or alternatively be implemented by a load detection means.

The example normalization engine 212 normalizes address information from the retrieved telemetry (e.g., processor trace) information in connection with retrieved DLL attribute information. In some examples, the normalization performed by the normalization engine 212 reduces noise associated with CFI analysis efforts. In some examples, noise is caused by randomly mapped DLLs and/or allocated buffers, which are invoked as a safety technique consistent with address space layout randomization (ASLR). DLL loading is a part of the control flow for an application of interest, and ASLR causes the DLLs to be loaded at different address locations in a random manner, thereby reducing a possibility of an attacker jumping to a particular exploited function in memory. Of course, such randomization is noisy and such noise is reduced by the example normalization engine 212, as described in further detail below. Furthermore, the normalization engine 212 reduces a degree of complexity typically introduced by the relatively large amount of detail associated with the byte granularity of TIP addresses. While such byte-level granularity is typically required for application instrumentation and debugging purposes, because examples disclosed herein avoid a need for compiler assistance, the example normalization engine 212 eliminates such excessive information that would normally inflate CFI modeling efforts, thereby improving performance of the example anomaly detection system 100. Stated differently, the example normalization engine 212 eliminates address randomness and unnecessary details without losing and/or otherwise neglecting information that is needed for hijack detection success.

The example control flow analyzer of FIG. 2 determines whether a control flow (e.g., one or more CFGs) is valid. If so, such information is utilized to update the models of the example DLL/CFI database 206 and/or the example CFI model storage 224. Similarly, information related to control flows that are not valid (e.g., suggesting that an application is no longer clean/safe) is also valuable when updating stored models, as described in further detail below. For instance, the example time series analysis engine 238 performs a time series analysis on the application to improve an accuracy or confidence level of models stored within the example DLL/CFI database 206 and/or the example CFI model storage 224. As described in further detail below, such time series analysis employs one or more machine learning techniques to assist with model confidence level adjustment efforts. The example model modifier 248 considers both time series analysis results (control flow detection results) and environment feedback information to adjust one or more confidence levels of the CFI models, as described in further detail below.

As described above, the example DLL load detector 204 builds the DLL database 206 to determine particular DLL loading events and DLL attributes associated therewith. The example DLL load detector 204 determines whether a DLL loading event has occurred and, if so, determines if a DLL identifier (ID) associated with the DLL is already stored in the example DLL database 206. If the example DLL is not found in the DLL database 206, then the example DLL load detector 204 reads corresponding metadata from the example DLL database 206 and stores it in the example DLL module list 208. Generally speaking, the example DLL module list 208 may include a memory that stores information related to currently utilized/loaded DLLs. Such memory may be relatively faster than information access attempts to the example DLL database 206. In some examples, the DLL database 206 is a storage drive technology that includes a relatively greater amount of storage capacity, but exhibits a relatively greater latency than the DLL module list 208 memory. Metadata associated with a loaded DLL includes, but is not limited to a unique DLL identifier (ID), a DLL name, image base information, image size information, entry point information, exported APIs, etc. In the event the loaded DLL is not in the example DLL database 206, then the example DLL load detector 204 parses the newly detected DLL for its corresponding metadata and stores it in both (a) the DLL database 206 and (b) the DLL module list 208 memory.

As described above, PT information may include a raw target instruction pointer (TIP) address. While examples disclosed herein refer to PT information, examples are not limited thereto and are disclosed as a matter of convenience and not limitation. As described above, example telemetry sources include PT information, PMU information and/or LBR information. In some examples, the TIP address is within and/or otherwise associated with a DLL that has been loaded and residing within the example DLL module list 208. The example normalization engine 212 selects an address (e.g., a TIP address) from a retrieved processor trace, and the example parsing engine 214 determines whether the retrieved address is associated with and/or otherwise within a DLL stored in the example DLL module list 208. If not, then such a circumstance is considered out-of-ordinary, but not necessarily indicative of an anomaly. Nonetheless, this circumstance is helpful in the aggregate of information that is used to update and/or otherwise train the example CFI models, and the example normalization engine 212 sets an ID parameter for the DLL of interest to zero and sets a corresponding offset address for the DLL of interest to zero. As used herein, a combination of a unique DLL ID and a corresponding offset is referred to herein as a normalized TIP (NTIP). A normalized control flow contains two NTIP addresses, one of which is a SOURCE NTIP and the other is a DESTINATION NTIP.

On the other hand, in the event that the TIP address corresponds to the DLL of interest stored in the example DLL module list 208, then the example normalization engine sets the DLL ID as the unique DLL ID that was previously stored as the DLLs metadata. However, other tests are employed to determine a corresponding offset before the NTIP is determined. In particular, the example normalization engine calculates a relative virtual address (RVA) in a manner consistent with example Equation 1.

$$RVA = (TIP\text{ address} - DLL\text{ base address}) \qquad \text{Equation 1.}$$

In the illustrated example of Equation 1, the TIP address reflects a TIP address from a processor trace, and the DLL base address reflects the base address of the DLL as determined by the parsing efforts of the example DLL load detector 204. The normalization engine 212 calculates the RVA as a difference value between the TIP address value retrieved from the telemetry (e.g., processor trace) information and a base address value corresponding to the DLL of interest. In some examples, calculation of the RVA by the normalization engine 212 may be bypassed in the event one or more subsequent tests/determinations are made that obviate a need for the RVA value. For instance, in the event that the example DLL entry point analyzer 218 determines that the TIP address has a value equal to the DLL entry point value (e.g., part of the DLL metadata), then the example DLL entry point analyzer 218 sets an offset value as that corresponding marker entry point (e.g., a special constant for DLL entry points). As such, the NTIP is complete and forwarded to the example control flow analyzer 220, described in further detail below. Worth noting is that such circumstances obviate a need to calculate the example RVA. Generally speaking, entry point and API checking are performed in view of that being some of the most common destinations of inter-DLL control flow transfers of concern. In some examples, control flow exploits (e.g., return oriented programming (ROP)) could cause erroneous control flow transfers to destination addresses that are similar, but still different than legitimate destinations (e.g., legitimate entry points, legitimate API addresses, etc.).

However, in the event the example DLL entry point analyzer 218 determines that the TIP value does not equal a value corresponding to the DLL entry point, then the example API analyzer 216 determines whether the TIP is associated with an exported API. In some examples, because the API information includes an API name, RVA information, an ordinal (as part of the extracted DLL metadata), then the example API analyzer 216 determines such associations with the TIP. If the TIP is associated with an exported API, the example API analyzer 216 sets a corresponding offset value in a manner consistent with example Equation 2.

$$\text{Offset} = (\text{Marker}_{Export} + API\text{ Ordinal}) \qquad \text{Equation 2.}$$

In the illustrated example of Equation 2, $\text{Marker}_{Export}$ reflects a particular constant selected to encode DLL addresses, but is not part of the DLL metadata, and the API Ordinal reflect an ordinal value extracted as part of the example DLL metadata. The example API analyzer 216 calculates the offset as a sum between a marker export API value, which is a special constant for exported APIs (not part of the DLL metadata), and an API ordinal value (part of the DLL metadata) associated with the DLL of interest. This offset value then completes the NTIP to be forwarded for further analysis.

However, in the event the example API analyzer 216 determines that the TIP is not associated with an exported API, then the example normalization engine calculates the offset in a manner consistent with example Equation 3.

$$\text{Offset} = \frac{RVA}{\text{Address Resolution}}. \qquad \text{Equation 3}$$

In the illustrated example of Equation 3, RVA reflects the relative virtual address calculated in example Equation 1, and Address Resolution is a selected resolution more granular than a resolution of fine-grained analysis. The example normalization engine 212 calculates the offset as a ratio between the RVA calculation, described above, and an address resolution value associated with a page level (e.g., 0x1000 for page-level rather than the substantially more-granular byte level). This offset value then completes the NTIP to be forwarded for further analysis. While the example above describes handling of one TIP address value, the example parsing engine 214 may iterate this process in view of any number of additional TIP address values in need of normalization. The NTIP represents normalized control flow information associated with the application of interest, as it is the result of (a) performance telemetry information (e.g., processor trace information) and (b) DLL loading information. However, unlike traditional CFI analysis techniques that include highly granular and noisy TIP address information, examples disclosed herein generate the normalized control flow information in a simplified manner containing an ID:Offset pair.

To determine whether the control flow is valid (and by extension whether its associated application is valid/clean), the example CFI model compliance engine 222 evaluates the example normalized control flow information in connection with the CFI models in the example CFI model storage 224 (e.g., the example coarse-grained DLL CFI model 226, the example coarse-grained TIP CFI model 228, the example fine-grained DLL CFI model 230, and the example fine-grained TIP CFI model 232). As described above, the example coarse-grained DLL CFI model 226 includes destination DLL IDs that are known to be clean/valid, the example coarse-grained TIP CFI model 228 includes normalized TIP address values that are known to be clean/valid, the example fine-grained DLL CFI model 230 includes DLL control flows that are known to be clean/valid, and the example fine-grained TIP CFI model 232 includes TIP control flows that are known to be clean/valid.

In the event that the example CFI model compliance engine 222 determines that a control flow is not valid, the example violation reporter 234 reports which one of the particular CFI model(s) in the example CFI model storage 224 that was/were violated. Additionally, the example CFI model compliance engine 222 reports a corresponding raw and normalized destination address associated with the violation. Using this information, the example rollback manager 236 performs a rollback to prevent commitment of the application via one or more OS messaging services to stop the offending application from further execution. While the aforementioned example identifies whether the application is clean/valid based on references to the example CFI models in the example CFI model storage 224, such CFI models may originate in an untrained and/or otherwise blank format. In some examples, the anomaly detection system 100 performs a number of iterations to train the example CFI models in the example CFI model storage 224 prior to relying on them for hijack determination.

To refine and/or otherwise train the example CFI models in the example CFI model storage 224, the example time series analysis engine 238 is invoked by the example control flow analyzer 220. The example control flow alert retriever 240 retrieves the detected control flow alerts from the example violation reporter 234, and the example spectral domain converter 244 transfers this time series control flow alert data to a spectral domain. In some examples, the spectral domain format of the control flow alert data enables a processing efficiency gain for the example machine learning modeling engine 242. In some examples, spectral transformation by the spectral domain converter 244 eliminates high-frequency noises in control flow anomaly detection efforts. Random noises will be transformed to high frequency bands with relatively lower weights so that time-series analysis can filter out such random noises and focus on relatively more important anomaly signal(s). In some examples, the spectral domain converter 244 transforms temporal control flow anomaly sequences to frequency domain signals to be applied to one or more machine learning processes. In some examples, the transformed frequency domain signals are to be applied by the example spectral domain converter 244 to one or more digital signal processing (DSP) algorithms. In either circumstance, the example spectral domain converter 244 applies the transformed frequency domain signals to identify benign and/or malicious control flow violation occurrences.

The example machine learning modeling engine 242 applies the spectral domain data to one or more machine learning models, and trains one or more machine learning classifiers using the control flow alerts from benign and malicious data samples. In some examples, the machine learning classifiers trained by the example machine learning modeling engine 242 are unsupervised, while in some examples known labeled applications are used to train the example classifiers. The example machine learning modeling engine 242 determines probability values corresponding to a series of control flow data regarding whether the software generating such series of control flow data (and by extension the application of interest) is malicious. Such probability values are applied in an iterative manner during repeated training occurrences to improve the example CFI models (e.g., in the example CFI model storage 224). The example temporary CFI database 246 stores unknown control flows (e.g., control flows that were detected and reported by the example control flow analyzer 220). Stated differently, the temporary CFI database 246 stores only control flows believed to be abnormal (e.g., by virtue of violating one or more models in the example CFI model storage 224). In operation, the example machine learning modeling engine 242 facilitates control flow model evaluation and learning via analysis of benign execution flows of monitored applications in a manner that does not require (devoid of) static code analysis and/or malicious execution flow occurrences. Stated differently, the example machine learning modeling engine 242 learns, trains and/or otherwise develops control flow models with benign execution flow analysis while bypassing analysis tasks corresponding to malicious code characterization and/or static code analysis.

History information regarding time series analysis results may be stored in a memory, log files, etc. Such storage of unknown control flows supports continuous control flow learning efforts, in which the control flow records stored in the temporary CFI database 246 are version controlled based on when such flows are added to that temporary CFI database 246. For example, particular control flows added within a same time window (e.g., a time window of 60-minutes) will be assigned, by the example control flow analyzer 220, a same version number. Additionally, the example rollback manager 236 controls CFI clearing, CFI merging and roll-back tasks using time stamp and version number information to identify particular control flows that require such clearing, merging and/or roll-back.

To update the example CFI models 224, the example model modifier 248 retrieves control flow detection results and the example environmental signal retriever 250 retrieves environmental feedback information/signals. Example environmental feedback information may be derived from security independent software vendors (ISVs) and/or end-users to indicate whether the platform of interest was infected or not. The example threshold tester 254 determines a degree to which CFI results (e.g., a probability output value of the machine learning) and the environmental feedback match. For example, if the CFI results indicate an 85% probability that the control flow results are malicious, and the environmental feedback indicates a 90% probability that the control flow is malicious, then there is only a 5% deviation therebetween. In the event that a threshold deviation value is 10% or less, for example, then the example threshold tester 254 identifies an agreement and/or otherwise rewarding condition in which confidence level(s) of models are to be increased. On the other hand, in the event the threshold is not satisfied (e.g., exceeds by more than 10%), then the example threshold tester 254 identifies a disagreement and/or otherwise correction condition in which confidence level(s) of models are to be decreased. In some examples, feedback may arrive in a binary state (e.g., true, false, 0, 1, yes, no, etc.) at any time after an alleged attack and/or reports of false positive(s) occurs. The example model modifier 248 compares such feedback information with historical results to determine an efficacy metric of prior control flow detections (e.g., true positive, true negative, false positive, false negative).

Additionally, in the event of a rewarding condition, the example true/false positive analyzer 252 determines whether the rewarding condition is a true positive or a true negative. As used herein, a true positive represents circumstances where a control flow alert matches a conclusion associated with the environmental feedback information (e.g., the platform of interest or application was actually infected). As used herein, a true negative represents circumstances where no control flow alert(s) have occurred, and the environmental feedback information also indicates that the platform of interest is not infected. If a true positive, then the example confidence level adjuster 256 increases a corresponding confidence level of at least one model. In some examples, the confidence level is increased in a manner proportionate to a degree to which the CFI results and the environmental feedback agree. In other words, the relative degree of similarity between the CFI results and the environmental feedback cause a relatively greater magnitude of confidence level adjustment (and vice versa). However, in some examples, and as described above, the environmental feedback information is binary (e.g., true=an infection occurred, false=an infection did not occur), while the example control flow alert information is represented in the form of a probability value. Accordingly, in some examples the control flow alert probabilities are converted to a binary value such that binary comparisons can occur. The example confidence level adjuster 256 also clears the temporary CFI database 246 because during reward conditions (e.g., both the environmental and control flow information agree) the CFI model(s) 224 are deemed effective, thus any allegedly abnormal control flows of the temporary CFI database 246 may be cleared. If not a true positive (e.g., rather, a true negative), the example confidence level adjuster 256 increases the confidence level in a manner proportionate to a degree to which the CFI results and the environmental feedback agree, and the temporary CFI database 246 is merged. That is, to reward true negative circumstances, examples disclosed herein add false control flow anomaly information (if any) to the model(s) 224 so that it will be less likely to generate any false anomalies in the future.

Returning to a situation in which the example threshold tester 254 determines that the CFI results and the environmental feedback do not satisfy the similarity threshold, the example true/false positive analyzer 252 determines whether a false positive condition is true. If so, then the example confidence level adjuster 256 reduces a confidence level of the model(s) in a manner proportionate to the degree to which the CFI results and the environmental feedback did not agree. Stated differently, the greater the degree to which these do not agree results in a relatively larger magnitude of confidence level drop for the model(s) of interest. The example confidence level adjuster 256 also merges the example temporary CFI database 246 to the main CFI models. Stated differently, merging moves the control flow information from the temporary CFI database 246 to the example DLL/CFI database 206 (e.g., the "main" CFI database), after which the temporary CFI database 246 is cleared. In effect this permits the CFI model(s) 224 to become more complete and less likely to generate false positive in the future.

On the other hand, in the event the example true/false positive analyzer 252 determines that a false positive condition is not true, then the example confidence level adjuster 256 reduces a corresponding model confidence level in a proportionate manner, as described above. Additionally, the example rollback manager 236 rolls-back one or more recent CFI merge operation(s). Generally speaking, confidence level adjustment of the CFI models occurs in an ongoing and/or otherwise continuous process. The example CFI models 224 are initially uninitialized, but confidence level adjustments in connection with the machine learning iterations improve the completeness and reliability of the CFI models 224 to identify malicious control flows from benign control flows. Additionally, because examples disclosed herein adjust CFI model 224 confidence levels in connection with the aforementioned normalization techniques, computational resources to detect process hijacking are reduced. Each control flow in the temporary CFI database 246 and the example DLL/CFI database 206 has an associated version number and/or timestamp. During rollback tasks, the example rollback manager 236 considers time information from the environmental feedback information to determine how far the rollback is to occur, as well as identify which control flow version numbers were merged at that time period. Corresponding control flows during that time window/version number are removed.

While an example manner of implementing the example anomaly detection system 100 of FIG. 1A and/or the example anomaly detector 106 of FIGS. 1 and 2 is illustrated in FIGS. 1 and 2, one or more of the elements, processes and/or devices illustrated in FIGS. 1 and/or 2 may be combined, divided, re-arranged, omitted, eliminated and/or implemented in any other way. Further, the example telemetry retriever 202, the example DLL load detector 204, the example DLL module list 208, the example DLL/CFI database 206, the example normalization engine 212, the example parsing engine 214, the example API analyzer 216, the example DLL entry point analyzer 218, the example control flow analyzer 220, the example CFI model compliance engine 222, the example CFI models 224, the example violation reporter 234, the example rollback manager 236, the example time series analysis engine 238, the example control flow alert retriever 240, the example machine learning modeling engine 242, the example spectral domain converter 244, the example temporary CFI database 246, the example model modifier 248, the example environmental signal retriever 250, the example true/false positive analyzer 252, the example threshold tester 254, the example confidence level adjuster 256 and/or, more generally, the example anomaly detector 106 of FIGS. 1 and 2 may be implemented by hardware, software, firmware and/or any combination of hardware, software and/or firmware. Thus, for example, any of the example telemetry retriever 202, the example DLL load detector 204, the example DLL module list 208, the example DLL/CFI database 206, the example normalization engine 212, the example parsing engine 214, the example API analyzer 216, the example DLL entry point analyzer 218, the example control flow analyzer 220, the example CFI model compliance engine 222, the example CFI models 224, the example violation reporter 234, the example rollback manager 236, the example time series analysis engine 238, the example control flow alert retriever 240, the example machine learning modeling engine 242, the example spectral domain converter 244, the example temporary CFI database 246, the example model modifier 248, the example environmental signal retriever 250, the example true/false positive analyzer 252, the example threshold tester 254, the example confidence level adjuster 256 and/or, more generally, the example anomaly detector 106 of FIGS. 1 and 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example telemetry retriever 202, the example DLL load detector 204, the example DLL module list 208, the example DLL/CFI database 206, the example normalization engine 212, the example parsing engine 214, the example API analyzer 216, the example DLL entry point analyzer 218, the example control flow analyzer 220, the example CFI model compliance engine 222, the example CFI models 224, the example violation reporter 234, the example rollback manager 236, the example time series analysis engine 238, the example control flow alert retriever 240, the example machine learning modeling engine 242, the example spectral domain converter 244, the example temporary CFI database 246, the example model modifier 248, the example environmental signal retriever 250, the example true/false positive analyzer 252, the example threshold tester 254, the example confidence level adjuster 256 and/or, more generally, the example anomaly detector 106 of FIGS. 1 and 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example anomaly detector 106 of FIGS. 1 and 2 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the anomaly detector 106 of FIGS. 1 and/or 2 is/are shown in FIGS. 3-8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 3-8, many other methods of implementing the example anomaly detector 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
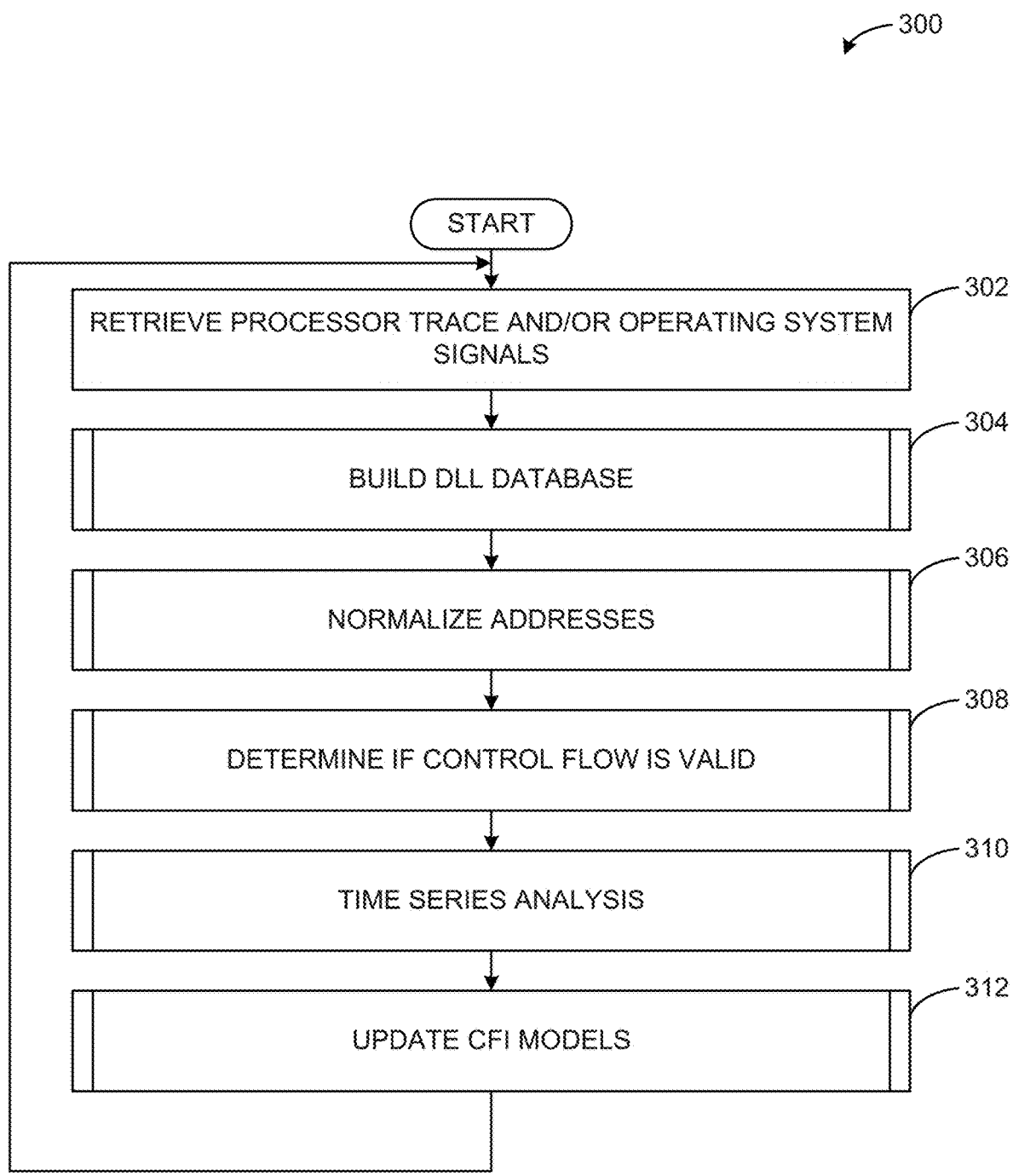
FIGS. 3-8 are flowcharts representative of machine readable instructions which may be executed to implement the example anomaly detector of FIGS. 1 and/or 2 to detect process hijacking.

The program 300 of FIG. 3 includes block 302, in which the example telemetry retriever 202 retrieves telemetry (e.g., processor trace) information. The example DLL load detector 204 builds and/or otherwise updates the example DLL database 206 (block 304), and the example normalization engine 212 normalizes one or more addresses in a manner that both reduces noise and improves computational efficiency (block 306) when detecting instances of hijacking activity. The example control flow analyzer 220 determines whether a control flow of interest is valid (block 308), and the example time series adjustment engine 238 performs a time series analysis of control flow information (block 310). The example model modifier 248 updates any number of CFI models (block 312) in a manner that improves an ability for the example anomaly detection system 100 to detect instances of process hijacking.

Figure 4:
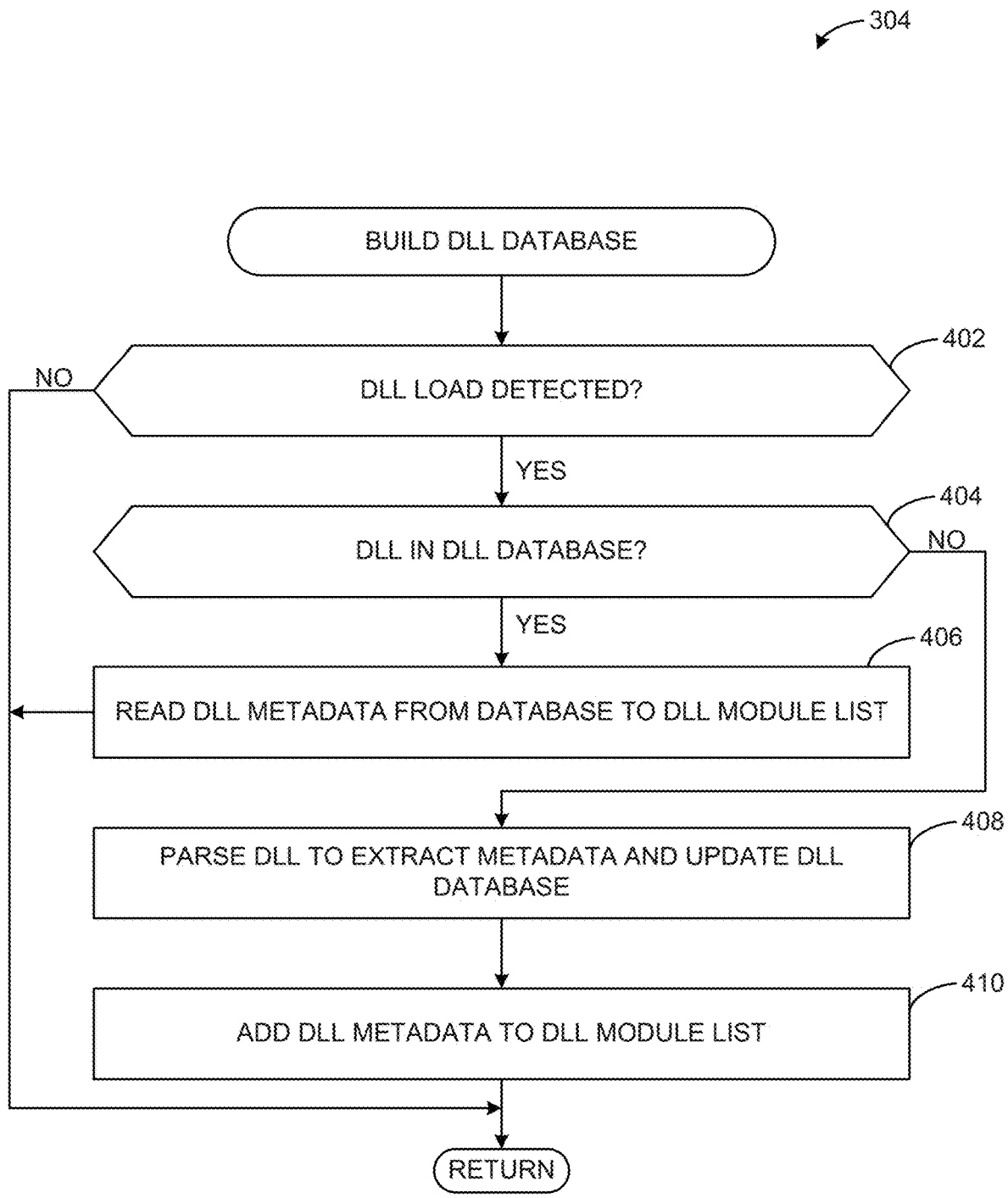

FIG. 4 illustrates additional detail of the program 304 of FIG. 3 to build and/or update the DLL database. In the illustrated example of FIG. 4, the example DLL load detector 204 determines and/or otherwise detects whether a DLL is being loaded (block 402). If not, the example program 304 of FIG. 4 returns to block 306 of FIG. 3. However, in the event the example DLL load detector 304 detects that a DLL has been loaded (block 402), the example DLL load detector queries the example DLL/CFI database 206 to determine if the loaded DLL is stored therein (block 404). In other words, if the recently loaded DLL is located by the DLL load detector 304 in the DLL/CFI database 206, then the recently loaded DLL is known. In the event the DLL is known (by virtue of it being identified in the example DLL/CFI database 206), then one or more computational efforts to parse the recently loaded DLL can be avoided, thereby conserving processing resources during the efforts to detect hijacking attempts. In response to the example DLL load detector 204 detecting that the recently loaded DLL is located in the example DLL/CFI database 206 (block 404), the example DLL load detector 204 reads metadata corresponding to the recently loaded DLL and saves it to the DLL module list 208 (block 406). However, if the example DLL load detector 204 determines that the recently loaded DLL is not in the example DLL/CFI database 206 (block 404), then the example DLL load detector 204 parses the recently received DLL to extract corresponding metadata and stores it in the example DLL/CFI database 206 (block 408). The example DLL load detector 204 adds the parsed metadata to the example DLL module list 208 (block 410).

Figure 5:
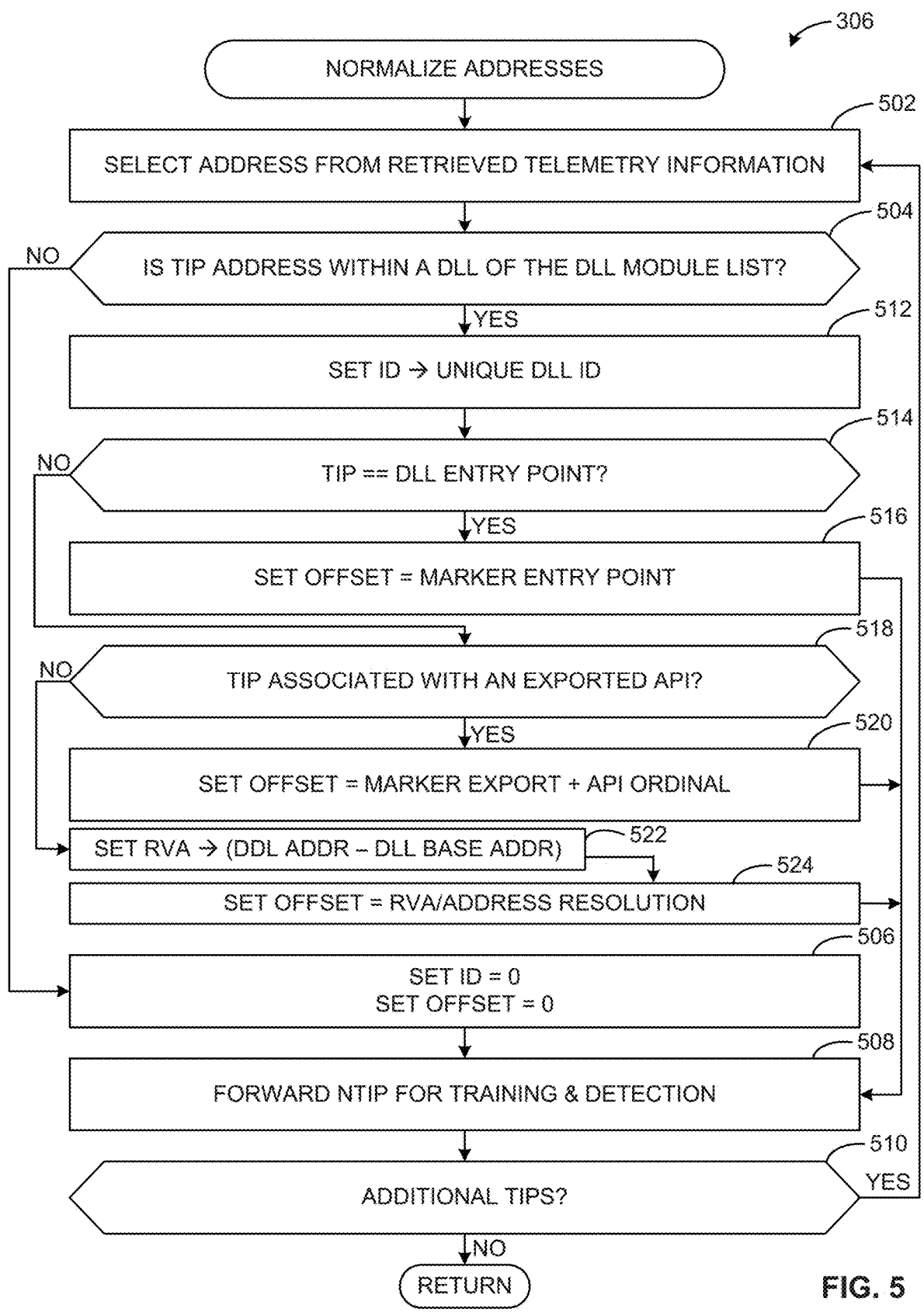

FIG. 5 illustrates additional detail corresponding to the program 306 of FIG. 3 to normalize address information. In the illustrated example of FIG. 5, the example normalization engine 212 selects an address (e.g., a target instruction pointer (TIP) address) from retrieved telemetry information (e.g., processor trace) (block 502). The example parsing engine 214 parses the address to determine whether the TIP address is within a DLL of the example DLL module list 208 (block 504). If not, the example normalization engine 212 generates an NTIP (also referred to herein as a normalized control flow) having an ID value of zero and an offset value of zero (block 506), which is forwarded to and/or otherwise retrieved by the example control flow analyzer 220 (block 508) to determine whether the control flow is valid. The example parsing engine 214 determines whether one or more additional TIPs need to be analyzed (block 510) and, if so, control returns to block 502, otherwise the example program 306 of FIG. 5 returns to block 308 of FIG. 3.

If the example parsing engine 214 determines that the TIP is within a DLL of the example DLL module list 208 (block 504), then the example normalization engine 212 sets the ID parameter of the NTIP to the unique value associated with the DLL (block 512). However, because the NTIP (normalized control flow) is a combination of a unique DLL ID and a corresponding offset address, the following normalization tasks determine an appropriate offset address. In particular, the example DLL entry point analyzer 218 determines whether the TIP address is equal to the DLL entry point value (block 514 (e.g., as determined by metadata corresponding to the DLL of interest), then the example DLL entry point analyzer 218 sets the offset parameter of the NTIP as that corresponding marker entry point (block 516) (e.g., a special constant for DLL entry points). Control of the example program 306 of FIG. 5 then advances to block 508.

If the example DLL entry point analyzer 218 determines that the TIP address is not equal to the DLL entry point value (block 514), then the example API analyzer 216 determines whether the TIP address is associated with an exported API (block 518). If so, then the example API analyzer 216 sets the offset parameter of the NTIP to a value equal to a sum of (a) a marker export API value and (b) an API ordinal value (block 520). On the other hand, if the example API analyzer 216 determines that the TIP address is not associated with an exported API (block 518), then the example normalization engine 212 calculates a relative virtual address (RVA) in a manner consistent with example Equation 1 (block 522). The example normalization engine 212 sets the offset parameter of the NTIP as a ratio of the RVA and the selected address resolution in a manner consistent with example Equation 3 (block 524). Control then advances to block 508.

Figure 6:
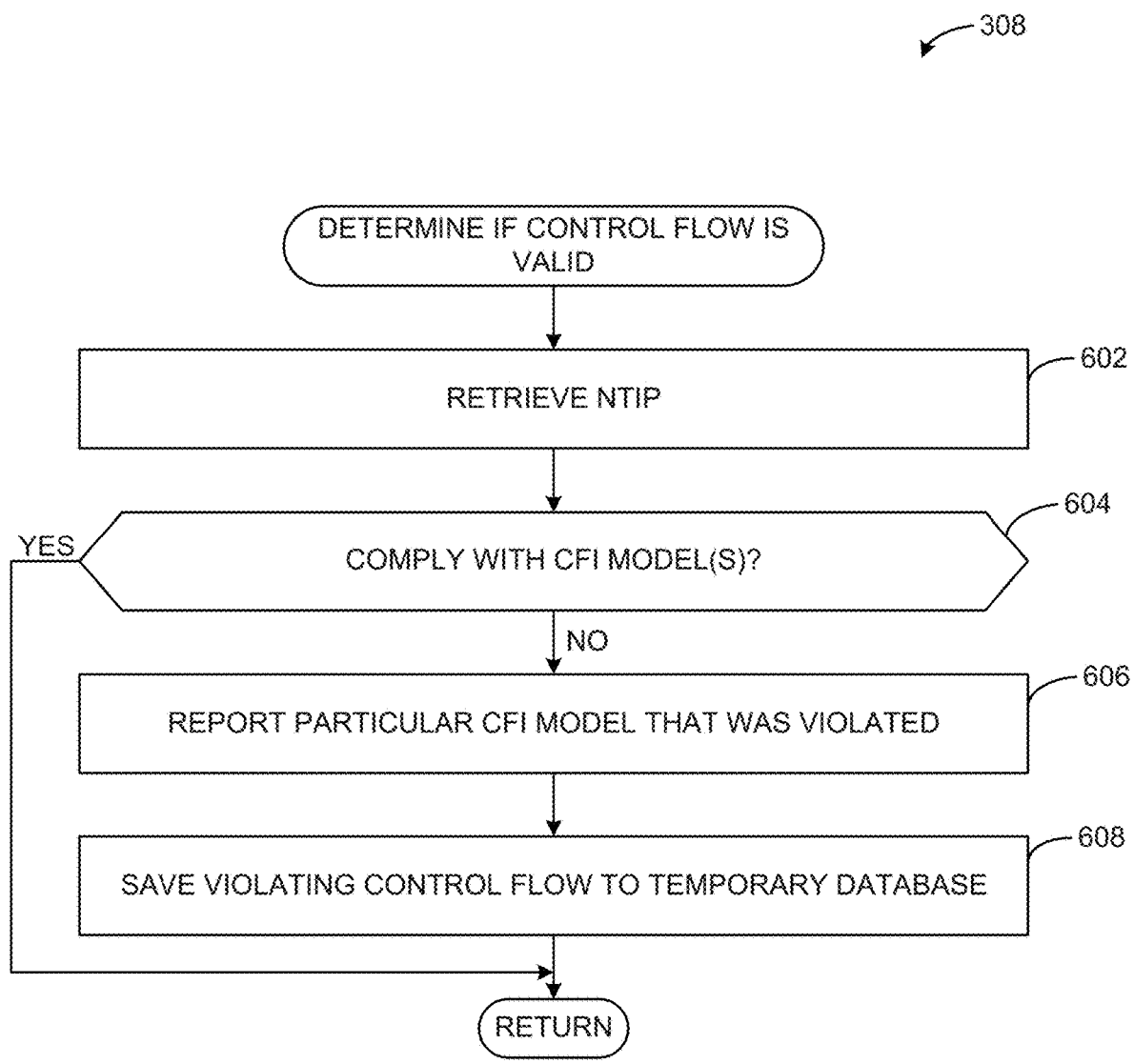

FIG. 6 illustrates additional detail corresponding to the program 308 of FIG. 3 to determine if the control flow is valid. In the illustrated example of FIG. 6, the example control flow analyzer 220 retrieves and/or otherwise receives the normalized control flow (NTIP) (block 602), which includes an address ID and offset value pair. The example CFI model compliance engine 222 determines whether the NTIP address complies with one or more of the example CFI models 224 (block 604) (e.g., the example coarse-grained DLL CFI model 226, the example coarse-grained TIP CFI model 228, the example fine-grained DLL CFI model 230, and the example fine-grained TIP CFI model 232). If so, then the example program 308 of FIG. 6 returns to block 310 of FIG. 3. However, in the event the example CFI model compliance engine 222 determines that the NTIP address does not comply with and/or otherwise violates one or more of the example CFI models 224 (block 604), then the example violation reporter 234 reports which one of the particular CFI models 224 was violated and reports a corresponding raw and normalized destination address (block 606). The example rollback manager 236 then saves the violating flow to the temporary CFI database 246 to maintain a degree of protection for the platform of interest (block 608). The example program 308 of FIG. 6 then returns to block 310 of FIG. 3.

Figure 7:
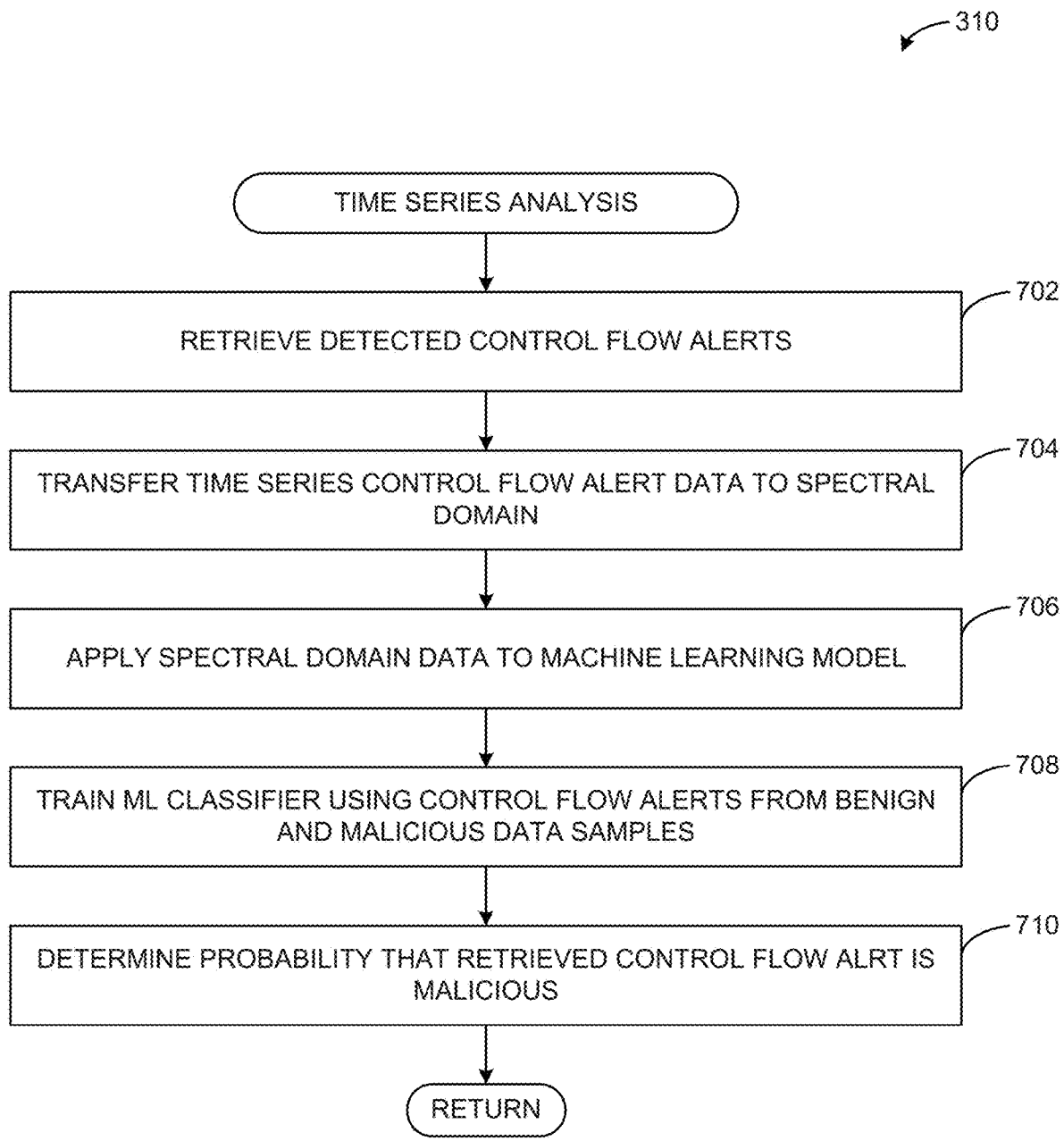

FIG. 7 illustrates additional detail corresponding to the program 310 of FIG. 3 to perform a time series analysis on validation results of analyzed normalized control flows (NTIPs). In the illustrated example of FIG. 7, the example control flow alert retriever 240 retrieves detected control flow alerts (block 702). The example detected control flow alerts include information indicative of both valid control flow determinations and malicious control flow determinations that may be associated with hijacking activity. Such determinations are the result of analysis in connection with the CFI models 224, the confidence of which improve after increasing numbers of iterative analysis. In other words, results of valid/invalid control flow information are used to adjust respective confidence values of the example CFI models 224 so that hijacking detection accuracy is improved. Such improvements also include consideration and/or analysis of environmental feedback. The example spectral domain converter 244 transfers time-series control flow alert data (both valid control flow instances and invalid/malicious control flow instances) to a spectral domain format (block 704), and the example machine learning modeling engine 242 applies the spectral domain data to one or more machine learning models (block 706). The example machine learning modeling engine 242 trains one or more machine learning classifiers using the spectral domain control flow alert data samples (block 708), and determines probability values indicative of a likelihood that particular ones of the control flows are malicious (block 710). Control of the example program 310 of FIG. 7 then advances to block 312 of FIG. 3.

Figure 8:
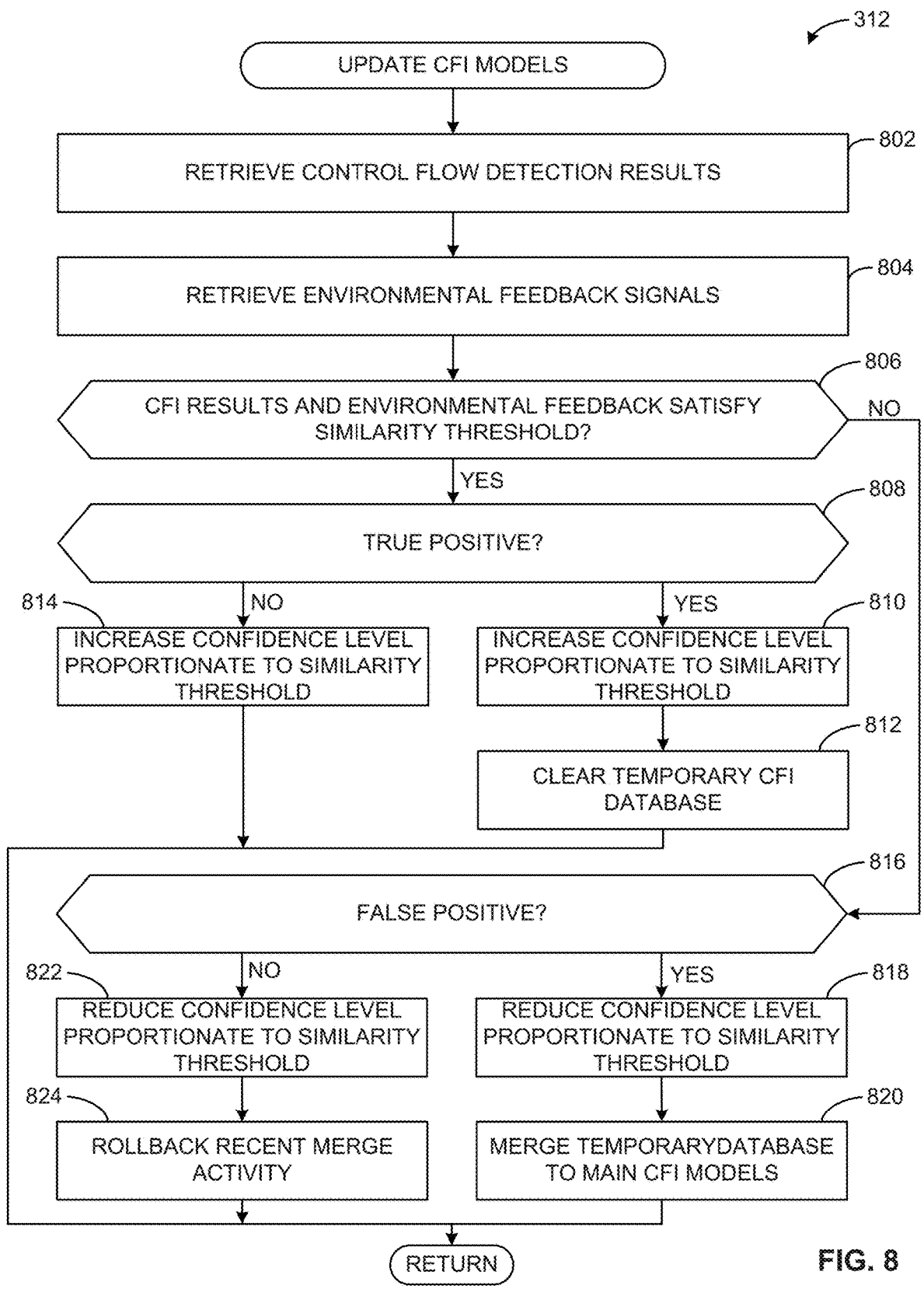

FIG. 8 illustrates additional detail corresponding to the program 312 of FIG. 3 to update the example CFI models 224. In the illustrated example of FIG. 8, the example model modifier 248 retrieves control flow detection results (block 802), such as previously stored results from the example temporary CFI database 246. The example environmental signal retriever 250 retrieves and/or otherwise receives environmental feedback signals (block 804), and the example threshold tester 254 determines whether the (a) control flow detection results and (b) environmental feedback signals, when compared, satisfy a similarity threshold value (block 806). If the example threshold tester 254 determines that the similarity threshold value is satisfied (e.g., a rewarding condition indicating that confidence values of the model(s) should be increased by an amount), such as a threshold value indicative of how closely the control flow detection results and environmental feedback signals agree (block 806), then the true/false positive analyzer 252 determines whether the rewarding condition is a true positive or a true negative (block 808). In the event of a true positive, the example confidence level adjuster 256 increases a corresponding confidence level of at least one model (block 810) and clears the example temporary CFI database 246 (block 812). On the other hand, if the example true/false positive analyzer 252 determines a true negative (block 808), then the example confidence level adjuster 256 increases the confidence level in a manner proportionate to a degree to which the CFI results and the environmental feedback agree without also clearing the temporary CFI database 246 (block 814).

In the event the example threshold tester 254 determines that the similarity threshold is not satisfied (block 806), such as a circumstance where the control flow detection results and environmental feedback signals substantially disagree, the example true/false positive analyzer 252 determines whether a false positive condition is true (block 816). If so, then the example confidence level adjuster 256 reduces a confidence level of the model(s) in a manner proportionate to the degree to which the CFI results and the environmental feedback did not agree (block 818). Additionally, the example confidence level adjuster 256 merges the example temporary CFI database 246 to the main CFI models (block 820). On the other hand, in the event the example true/false positive analyzer 252 determines that a false positive condition is not true (block 816), then the example confidence level adjuster 256 reduces a corresponding model confidence level in a proportionate manner (block 822). Additionally, the example rollback manager 236 rolls-back one or more recent CFI merge operation(s) (block 824).

Figure 9:
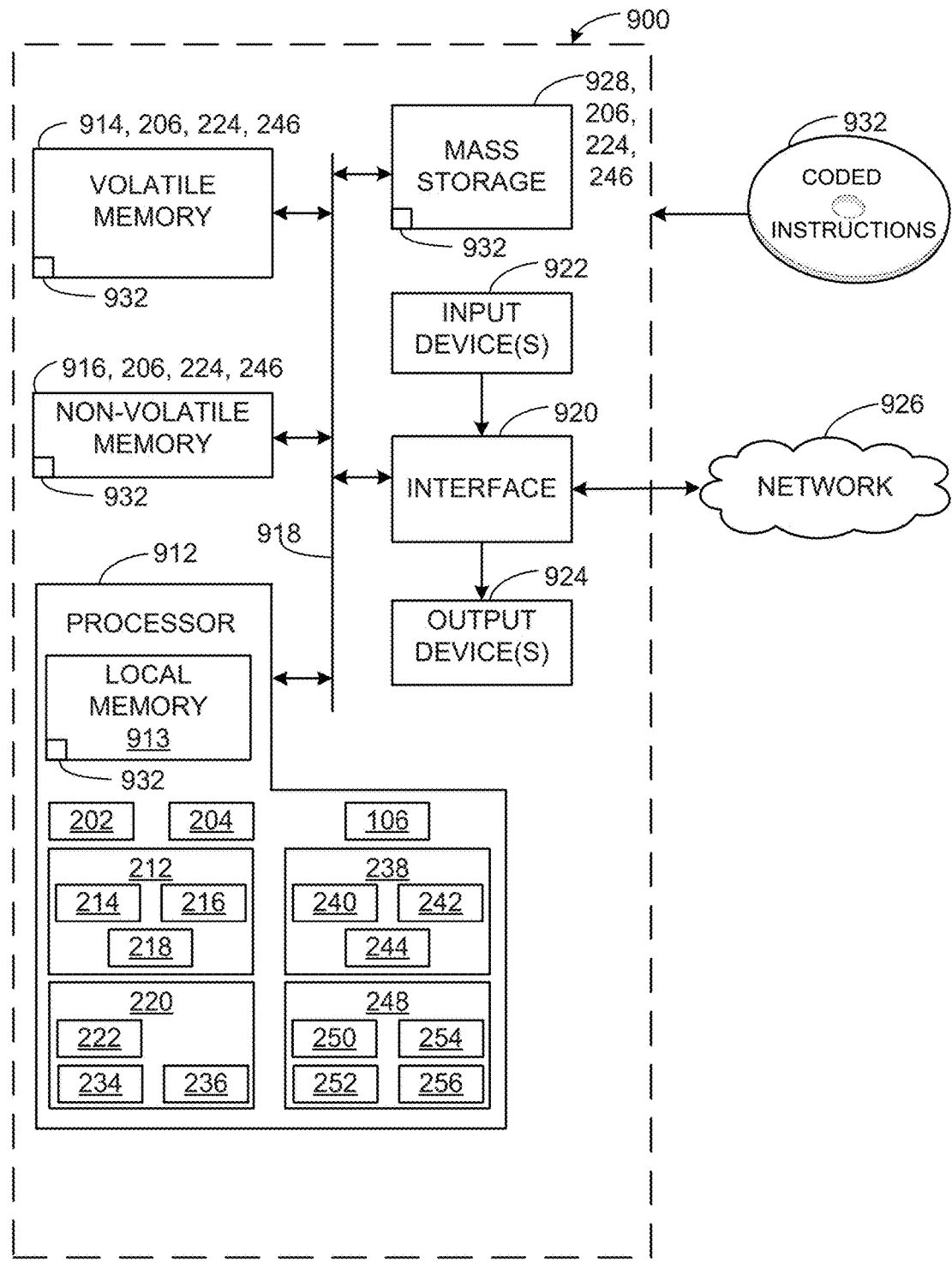
FIG. 9 is a block diagram of an example processing platform structured to execute the instructions of FIGS. 3-8 to implement the example anomaly detector of FIGS. 1 and/or 2 to detect process hijacking.

FIG. 9 is a block diagram of an example processor platform 900 structured to execute the instructions of FIGS. 3-8 to implement the example anomaly detector 106 of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a digital video recorder, a gaming console, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example telemetry retriever 202, the example DLL load detector 204, the example DLL module list 208, the example normalization engine 212, the example parsing engine 214, the example API analyzer 216, the example DLL entry point analyzer 218, the example control flow analyzer 220, the example CFI model compliance engine 222, the example CFI models 224, the example violation reporter 234, the example rollback manager 236, the example time series analysis engine 238, the example control flow alert retriever 240, the example machine learning modeling engine 242, the example spectral domain converter 244, the example model modifier 248, the example environmental signal retriever 250, the example true/false positive analyzer 252, the example threshold tester 254, the example confidence level adjuster 256 and/or, more generally, the example anomaly detector 106.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 3-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that detect hijacking threats based on telemetry (e.g., processor trace) data and TIP address information that includes a reduced amount of noise and complexity due to normalization efforts thereto. The disclosed methods, apparatus and articles of manufacture improve the efficiency of using a computing device by performing such normalization efforts because, in part, TIP address information is typically voluminous with fine-grain detail, all of which is unnecessary to process when detecting hijacking behaviors. The disclosed methods, apparatus and articles of manufacture are accordingly directed to one or more improvement(s) in the functioning of a computer.

Disclosed herein are example systems, apparatus, articles of manufacture and methods to detect process hijacking. Example 1 includes an apparatus to detect control flow anomalies the apparatus comprising a parsing engine to compare a target instruction pointer (TIP) address to a dynamic link library (DLL) module list, and in response to detecting a match of the TIP address to a DLL in the DLL module list, set a first portion of a normalized TIP address to a value equal to an identifier of the DLL, a DLL entry point analyzer to set a second portion of the normalized TIP address based on a comparison between the TIP address and an entry point of the DLL, and a model compliance engine to generate a flow validity decision based on a comparison between (a) the first and second portion of the normalized TIP address and (b) a control flow integrity model.

Example 2 includes the apparatus as defined in example 1, further including a telemetry retriever to retrieve the TIP address from a platform kernel.

Example 3 includes the apparatus as defined in example 1, further including a DLL load detector to detect a load occurrence of the DLL on a platform executing an application.

Example 4 includes the apparatus as defined in example 3, wherein the DLL load detector is to extract metadata associated with the DLL in response to the load occurrence.

Example 5 includes the apparatus as defined in example 1, wherein the DLL entry point analyzer is to set the second portion of the normalized TIP address as an offset address corresponding to a DLL marker entry point.

Example 6 includes the apparatus as defined in example 1, further including an application programming interface (API) analyzer to determine if the TIP address corresponds to an exported API associated with the DLL.

Example 7 includes the apparatus as defined in example 6, wherein the API analyzer is to set the second portion of the normalized TIP address as an offset based on a sum of (a) a marker export value of the exported API and (b) an ordinal value of the exported API.

Example 8 includes the apparatus as defined in example 1, wherein the model compliance engine is to generate the flow validity decision in connection with at least one of telemetry information and machine learning models.

Example 9 includes the apparatus as defined in example 1, further including a telemetry retriever to retrieve telemetry information as at least one of processor trace information, performance monitor unit event information, last branch record information, or operating system runtime event information.

Example 10 includes the apparatus as defined in example 9, wherein the telemetry retriever is to detect control flow violation occurrences that are inconsistent with at least one of coarse-grain control flow models or fine-grain control flow models.

Example 11 includes the apparatus as defined in example 1, further including a machine learning modeling engine to train the control flow integrity model without at least one of static code analysis or malicious code characterization.

Example 12 includes the apparatus as defined in example 1, further including a spectral domain converter to transform at least one control flow anomaly sequence to a frequency domain signal.

Example 13 includes the apparatus as defined in example 12, wherein the spectral domain converter is to identify at least one of benign or malicious control flow violations by applying the frequency domain signal to at least one of a machine learning algorithm or a digital signal processing algorithm.

Example 14 includes a non-transitory computer readable storage medium comprising computer readable instructions that, when executed, cause at least one processor to compare a target instruction pointer (TIP) address to a dynamic link library (DLL) module list, in response to detecting a match of the TIP address to a DLL in the DLL module list, set a first portion of a normalized TIP address to a value equal to an identifier of the DLL, set a second portion of the normalized TIP address based on a comparison between the TIP address and an entry point of the DLL, and generate a flow validity decision based on a comparison between (a) the first and second portion of the normalized TIP address and (b) a control flow integrity model.

Example 15 includes the non-transitory computer readable storage medium as defined in example 14, wherein the instructions, when executed, further cause the processor to retrieve the TIP address from a platform kernel.

Example 16 includes the non-transitory computer readable storage medium as defined in example 14, wherein the instructions, when executed, further cause the processor to detect a load occurrence of the DLL on a platform executing an application.

Example 17 includes the non-transitory computer readable storage medium as defined in example 16, wherein the instructions, when executed, further cause the processor to extract metadata associated with the DLL in response to the load occurrence.

Example 18 includes the non-transitory computer readable storage medium as defined in example 14, wherein the instructions, when executed, further cause the processor to set the second portion of the normalized TIP address as an offset address corresponding to a DLL marker entry point.

Example 19 includes the non-transitory computer readable storage medium as defined in example 14, wherein the instructions, when executed, further cause the processor to determine if the TIP address corresponds to an exported API associated with the DLL.

Example 20 includes the non-transitory computer readable storage medium as defined in example 19, wherein the instructions, when executed, further cause the processor to set the second portion of the normalized TIP address as an offset based on a sum of (a) a marker export value of the exported API and (b) an ordinal value of the exported API.

Example 21 includes the non-transitory computer readable storage medium as defined in example 14, wherein the instructions, when executed, further cause the processor to generate the flow validity decision in connection with at least one of telemetry information and machine learning models.

Example 22 includes the non-transitory computer readable storage medium as defined in example 14, wherein the instructions, when executed, further cause the processor to retrieve telemetry information as at least one of processor trace information, performance monitor unit event information, last branch record information, or operating system runtime event information.

Example 23 includes the non-transitory computer readable storage medium as defined in example 22, wherein the instructions, when executed, further cause the processor to detect control flow violation occurrences that are inconsistent with at least one of coarse-grain control flow models or fine-grain control flow models.

Example 24 includes the non-transitory computer readable storage medium as defined in example 14, wherein the instructions, when executed, further cause the processor to train the control flow integrity model without at least one of static code analysis or malicious code characterization.

Example 25 includes the non-transitory computer readable storage medium as defined in example 14, wherein the instructions, when executed, further cause the processor to transform at least one control flow anomaly sequence to a frequency domain signal.

Example 26 includes the non-transitory computer readable storage medium as defined in example 25, wherein the instructions, when executed, further cause the processor to identify at least one of benign or malicious control flow violations by applying the frequency domain signal to at least one of a machine learning algorithm or a digital signal processing algorithm.

Example 27 includes a system to detect control flow anomalies, the system comprising means for parsing to compare a target instruction pointer (TIP) address to a dynamic link library (DLL) module list, and in response to detecting a match of the TIP address to a DLL in the DLL module list, set a first portion of a normalized TIP address to a value equal to an identifier of the DLL, means for DLL analyzing to set a second portion of the normalized TIP address based on a comparison between the TIP address and an entry point of the DLL, and means for modeling to generate a flow validity decision based on a comparison between (a) the first and second portion of the normalized TIP address and (b) a control flow integrity model.

Example 28 includes the system as defined in example 27, further including means for telemetry retrieving to retrieve the TIP address from a platform kernel.

Example 29 includes the system as defined in example 27, further including means for load detection to detect a load occurrence of the DLL on a platform executing an application.

Example 30 includes the system as defined in example 29, wherein the load detection means is to extract metadata associated with the DLL in response to the load occurrence.

Example 31 includes the system as defined in example 27, wherein the DLL analyzing means is to set the second portion of the normalized TIP address as an offset address corresponding to a DLL marker entry point.

Example 32 includes the system as defined in example 27, further including means for interface analyzing to determine if the TIP address corresponds to an exported API associated with the DLL.

Example 33 includes the system as defined in example 32, wherein the interface analyzing means is to set the second portion of the normalized TIP address as an offset based on a sum of (a) a marker export value of the exported API and (b) an ordinal value of the exported API.

Example 34 includes the system as defined in example 27, wherein the modeling means is to generate the flow validity decision in connection with at least one of telemetry information and machine learning models.

Example 35 includes the system as defined in example 27, further including means for retrieving telemetry to retrieve telemetry information as at least one of processor trace information, performance monitor unit event information, last branch record information, or operating system runtime event information.

Example 36 includes the system as defined in example 35, wherein the telemetry retrieving means is to detect control flow violation occurrences that are inconsistent with at least one of coarse-grain control flow models or fine-grain control flow models.

Example 37 includes the system as defined in example 27, further including means for machine learning modeling to train the control flow integrity model without at least one of static code analysis or malicious code characterization.

Example 38 includes the system as defined in example 27, further including means for converting to transform at least one control flow anomaly sequence to a frequency domain signal.

Example 39 includes the system as defined in example 38, wherein the converting means is to identify at least one of benign or malicious control flow violations by applying the frequency domain signal to at least one of a machine learning algorithm or a digital signal processing algorithm.

Example 40 includes a computer implemented method to detect control flow anomalies, the method comprising comparing a target instruction pointer (TIP) address to a dynamic link library (DLL) module list, in response to detecting a match of the TIP address to a DLL in the DLL module list, setting a first portion of a normalized TIP address to a value equal to an identifier of the DLL, setting a second portion of the normalized TIP address based on a comparison between the TIP address and an entry point of the DLL, and generating a flow validity decision based on a comparison between (a) the first and second portion of the normalized TIP address and (b) a control flow integrity model.

Example 41 includes the computer implemented method as defined in example 40, further including causing the processor to retrieve the TIP address from a platform kernel.

Example 42 includes the computer implemented method as defined in example 40, further including detecting a load occurrence of the DLL on a platform executing an application.

Example 43 includes the computer implemented method as defined in example 42, further including extracting metadata associated with the DLL in response to the load occurrence.

Example 44 includes the computer implemented method as defined in example 40, further including setting the second portion of the normalized TIP address as an offset address corresponding to a DLL marker entry point.

Example 45 includes the computer implemented method as defined in example 40, further including determining if the TIP address corresponds to an exported API associated with the DLL.

Example 46 includes the computer implemented method as defined in example 45, further including setting the second portion of the normalized TIP address as an offset based on a sum of (a) a marker export value of the exported API and (b) an ordinal value of the exported API.

Example 47 includes the computer implemented method as defined in example 40, further including generating the flow validity decision in connection with at least one of telemetry information and machine learning models.

Example 48 includes the computer implemented method as defined in example 40, further including retrieving telemetry information as at least one of processor trace information, performance monitor unit event information, last branch record information, or operating system runtime event information.

Example 49 includes the computer implemented method as defined in example 48, further including detecting control flow violation occurrences that are inconsistent with at least one of coarse-grain control flow models or fine-grain control flow models.

Example 50 includes the computer implemented method as defined in example 40, further including training the control flow integrity model without at least one of static code analysis or malicious code characterization.

Example 51 includes the computer implemented method as defined in example 40, further including transforming at least one control flow anomaly sequence to a frequency domain signal.

Example 52 includes the computer implemented method as defined in example 51, further including identifying at least one of benign or malicious control flow violations by applying the frequency domain signal to at least one of a machine learning algorithm or a digital signal processing algorithm.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect control flow anomalies, the apparatus comprising:
    parsing engine circuitry to:
        perform a first comparison between a raw target instruction pointer (TIP) address and a dynamic link library (DLL) module list; and
        in response to detecting a match of the raw TIP address to a DLL in the DLL module list, convert the raw TIP address to a normalized TIP address by setting a first portion of the normalized TIP address to a value equal to an identifier of the DLL;
    DLL entry point analyzing circuitry to set a second portion of the normalized TIP address based on a second comparison between the raw TIP address and an entry point of the DLL; and
    model compliance engine circuitry to generate a flow validity decision based on a third comparison between (a) the first portion and the second portion of the normalized TIP address and (b) a control flow integrity model.

2. The apparatus as defined in claim 1, further including telemetry retrieving circuitry to retrieve the raw TIP address from a platform kernel.

3. The apparatus as defined in claim 1, further including DLL load detecting circuitry to detect a load occurrence of the DLL on a platform executing an application.

4. The apparatus as defined in claim 1, wherein the DLL entry point analyzing circuitry is to set the second portion of the normalized TIP address as an offset address corresponding to a DLL marker entry point.

5. The apparatus as defined in claim 1, further including application programming interface (API) analyzing circuitry to determine if the raw TIP address corresponds to an exported API associated with the DLL.

6. The apparatus as defined in claim 5, wherein the API analyzing circuitry is to set the second portion of the normalized TIP address as an offset based on a sum of (a) a marker export value of the exported API and (b) an ordinal value of the exported API.

7. The apparatus as defined in claim 1, further including telemetry retrieving circuitry to retrieve telemetry information as at least one of processor trace information, performance monitor unit event information, last branch record information, or operating system runtime event information.

8. The apparatus as defined in claim 7, wherein the telemetry retrieving circuitry is to detect control flow violation occurrences that are inconsistent with at least one of coarse-grain control flow models or fine-grain control flow models.

9. A non-transitory computer readable storage medium comprising computer readable instructions that, when executed, cause at least one processor to:
    perform a first comparison between a raw target instruction pointer (TIP) address and a dynamic link library (DLL) module list;
    in response to detecting a match of the raw TIP address to a DLL in the DLL module list, convert the raw TIP address to a normalized TIP address by setting a first portion of the normalized TIP address to a value equal to an identifier of the DLL;
    set a second portion of the normalized TIP address based on a second comparison between the raw TIP address and an entry point of the DLL; and
    generate a flow validity decision based on a third comparison between (a) the first portion and the second portion of the normalized TIP address and (b) a control flow integrity model.

10. The non-transitory computer readable storage medium as defined in claim 9, wherein the instructions, when executed, further cause the processor to detect a load occurrence of the DLL on a platform executing an application.

11. The non-transitory computer readable storage medium as defined in claim 10, wherein the instructions, when executed, further cause the processor to extract metadata associated with the DLL in response to the load occurrence.

12. The non-transitory computer readable storage medium as defined in claim 9, wherein the instructions, when executed, further cause the processor to generate the flow validity decision in connection with at least one of telemetry information and machine learning models.

13. The non-transitory computer readable storage medium as defined in claim 9, wherein the instructions, when executed, further cause the processor to train the control flow integrity model without at least one of static code analysis or malicious code characterization.

14. The non-transitory computer readable storage medium as defined in claim 9, wherein the instructions, when executed, further cause the processor to transform at least one control flow anomaly sequence to a frequency domain signal.

15. The non-transitory computer readable storage medium as defined in claim 14, wherein the instructions, when executed, further cause the processor to identify at least one of benign or malicious control flow violations by applying the frequency domain signal to at least one of a machine learning algorithm or a digital signal processing algorithm.

16. A system to detect control flow anomalies, the system comprising:
    means for parsing to:
        perform a first comparison between a raw target instruction pointer (TIP) address and a dynamic link library (DLL) module list; and
        in response to detecting a match of the raw TIP address to a DLL in the DLL module list, convert the raw TIP address to a normalized TIP address by setting a first portion of the normalized TIP address to a value equal to an identifier of the DLL;
    means for DLL analyzing to set a second portion of the normalized TIP address based on a second comparison between the TIP address and an entry point of the DLL; and
    means for modeling to generate a flow validity decision based on a third comparison between (a) the first portion and the second portion of the normalized TIP address and (b) a control flow integrity model.

17. The system as defined in claim 16, further including means for telemetry retrieving to retrieve the raw TIP address from a platform kernel.

18. The system as defined in claim 16, further including means for load detection to detect a load occurrence of the DLL on a platform executing an application.

19. The system as defined in claim 18, wherein the means for load detection are to extract metadata associated with the DLL in response to the load occurrence.

20. The system as defined in claim 16, wherein the means for DLL analyzing are to set the second portion of the normalized TIP address as an offset address corresponding to a DLL marker entry point.

21. A computer implemented method to detect control flow anomalies, the method comprising:
  performing a first comparison between a raw target instruction pointer (TIP) address and a dynamic link library (DLL) module list;
  in response to detecting a match of the raw TIP address to a DLL in the DLL module list, converting the raw TIP address to a normalized TIP address by setting a first portion of the normalized TIP address to a value equal to an identifier of the DLL;
  setting a second portion of the normalized TIP address based on a second comparison between the raw TIP address and an entry point of the DLL; and
  generating a flow validity decision based on a third comparison between (a) the first portion and the second portion of the normalized TIP address and (b) a control flow integrity model.

22. The computer implemented method as defined in claim 21, further including retrieving the raw TIP address from a platform kernel.

23. The computer implemented method as defined in claim 21, further including detecting a load occurrence of the DLL on a platform executing an application.

24. The computer implemented method as defined in claim 23, further including extracting metadata associated with the DLL in response to the load occurrence.

25. The computer implemented method as defined in claim 21, further including setting the second portion of the normalized TIP address as an offset address corresponding to a DLL marker entry point.

* * * * *